United States Patent
Wu

(10) Patent No.: US 11,545,885 B2
(45) Date of Patent: Jan. 3, 2023

(54) AUXILIARY POWER SUPPLY CIRCUIT OPERATING WITHIN A WIDE INPUT VOLTAGE RANGE

(71) Applicant: MINMAX TECHNOLOGY CO., LTD., Tainan (TW)

(72) Inventor: Cheng-Chou Wu, Tainan (TW)

(73) Assignee: MINMAX TECHNOLOGY CO., LTD., Tainan (TW)

( * ) Notice: Subject to any disclaimer, the term of this patent is extended or adjusted under 35 U.S.C. 154(b) by 28 days.

(21) Appl. No.: 17/096,259

(22) Filed: Nov. 12, 2020

(65) Prior Publication Data

US 2021/0296987 A1 Sep. 23, 2021

(30) Foreign Application Priority Data

Mar. 19, 2020 (TW) ................................. 109109189

(51) Int. Cl.
*H02M 1/00* (2006.01)
*G05F 3/18* (2006.01)
*H02M 1/36* (2007.01)
*G05F 1/46* (2006.01)

(52) U.S. Cl.
CPC ........... *H02M 1/0006* (2021.05); *H02M 1/36* (2013.01); *G05F 1/468* (2013.01); *G05F 3/18* (2013.01); *H02M 1/0045* (2021.05)

(58) Field of Classification Search
CPC .... H02M 1/0006; H02M 1/0045; H02M 1/36; G05F 1/468; G05F 3/18; G05F 3/185
See application file for complete search history.

(56) References Cited

U.S. PATENT DOCUMENTS

| | | | |
|---|---|---|---|
| 4,864,213 A * | 9/1989 | Kido | .................... H02M 3/156 323/299 |
| 6,130,826 A * | 10/2000 | Matsumoto | ............. H02M 1/36 363/95 |
| 6,340,852 B1 | 1/2002 | Mizoguchi | |

(Continued)

FOREIGN PATENT DOCUMENTS

| CN | 1275727 A | 12/2000 |
|---|---|---|
| CN | 102195462 A | 9/2011 |

(Continued)

*Primary Examiner* — Fred E Finch, III
(74) *Attorney, Agent, or Firm* — Alan D. Kamrath; Karin L. Williams; Mayer & Williams PC

(57) ABSTRACT

An auxiliary power supply circuit operating within a wide input voltage range has a voltage follower unit and a voltage comparison unit. The voltage follower unit has an electronic switch, a resistor, and a Zener diode. The electronic switch has a first terminal electrically connected to a voltage input terminal of the working voltage conversion circuit, a second terminal electrically connected to a voltage output terminal of the working voltage conversion circuit, and a control terminal. The resistor is electrically connected between the first terminal and the control terminal of the electronic switch. The Zener diode has a cathode electrically connected to the control terminal of the electronic switch. The voltage comparison unit has a detecting terminal electrically connected to the voltage input terminal of the working voltage conversion circuit, and an output terminal electrically connected to the control terminal of the electronic switch.

3 Claims, 4 Drawing Sheets

(56) References Cited

U.S. PATENT DOCUMENTS

| | | | |
|---|---|---|---|
| 10,498,223 B1 | 12/2019 | Chan | |
| 2003/0067288 A1 | 4/2003 | Schmitt | |
| 2008/0116859 A1 | 5/2008 | Usui | |
| 2009/0213629 A1* | 8/2009 | Liu | H02M 7/155 |
| | | | 363/89 |
| 2019/0207507 A1* | 7/2019 | Nonaka | H02M 3/28 |
| 2019/0384334 A1 | 12/2019 | Warren et al. | |
| 2019/0393865 A1* | 12/2019 | Jung | H02H 9/04 |
| 2021/0099086 A1* | 4/2021 | Brenguier | G05F 1/468 |
| 2021/0194376 A1* | 6/2021 | Lee | H02M 1/32 |

FOREIGN PATENT DOCUMENTS

| | | |
|---|---|---|
| CN | 205318269 U | 6/2016 |
| CN | 206452296 U | 8/2017 |
| CN | 108173426 A | 6/2018 |
| CN | 108768178 A | 11/2018 |
| JP | H03195359 A | 8/1991 |
| JP | H11259151 A | 9/1999 |
| JP | 2001309653 A | 11/2001 |
| TW | I678874 B | 12/2019 |
| TW | M591640 U | 3/2020 |

* cited by examiner

AUXILIARY POWER SUPPLY CIRCUIT OPERATING WITHIN A WIDE INPUT VOLTAGE RANGE

CROSS REFERENCE TO RELATED APPLICATIONS

The present application claims priority to Taiwan application No. 109109189, filed on Mar. 19, 2020, the content of which is hereby incorporated by reference in its entirety.

BACKGROUND OF THE INVENTION

1. Field of the Invention

The present application relates generally to an auxiliary power supply circuit, and more particularly to an auxiliary power supply circuit operating within a wide input voltage range.

2. Description of Related Art

The feature of a wide input voltage range direct-current (DC) power converter is to receive an input voltage within an input voltage range from a lower-limit voltage to a higher-limit voltage and convert it to an output voltage. The output voltage may maintain a constant for being provided to a rear-stage circuit (load). For example, the circuit configuration of the wide input voltage range DC power converter may comprise multiple electronic components, such as a transformer, a working voltage conversion circuit, an integrated circuit (IC), a feedback circuit, transistors, etc. For example, the IC may be a pulse width modulation controller (PWM controller).

In the aforementioned DC power converter, the electronic components' working voltage is received from the working voltage conversion circuit. The working voltage conversion circuit may be a Buck converter as an example. An input voltage received by the working voltage conversion circuit is within the wide input voltage range, which is the same as the input voltage range of the DC power converter. The working voltage conversion circuit converts the input voltage into a working voltage needed by the electronic components.

A stable working voltage is essentially required by all electronic components to normally operate. However, before the Buck converter reaches a steady state (e.g.: the input voltage and the output voltage of the Buck converter approximate to each other), unstable voltage ripples occur in the waveform of the output voltage of the Buck converter actually. Due to the unstable voltage ripples, the working voltage outputted to the electronic components is unstable, thereby directly affecting the operation of the electronic components.

SUMMARY OF THE INVENTION

An objective of the present invention is to provide an auxiliary power supply circuit operating within a wide input voltage range. The auxiliary power supply circuit of the present invention is applied for being electrically connected to a working voltage conversion circuit of a wide input voltage range direct-current (DC) power converter. Before the working voltage conversion circuit reaches the steady state, the auxiliary power supply circuit of the present invention provides the electronic components with a stable working voltage, in order to overcome the problem that the electronic components fail to normally operate due to the unstable working voltage in the prior art.

The auxiliary power supply circuit operating within a wide input voltage range of the present invention is applied to be electrically connected to a working voltage conversion circuit of a wide input voltage range direct-current (DC) power converter. The auxiliary power supply circuit of the present invention comprises a voltage follower unit and a voltage comparison unit.

The voltage follower unit comprises an electronic switch, a resistor, and a Zener diode. The electronic switch comprises a first terminal, a second terminal, and a control terminal. The first terminal is electrically connected to a voltage input terminal of the working voltage conversion circuit. The second terminal is electrically connected to a voltage output terminal of the working voltage conversion circuit. The resistor is electrically connected between the first terminal of the electronic switch and the control terminal of the electronic switch. The Zener diode has a cathode electrically connected to the control terminal of the electronic switch.

The voltage comparison unit comprises a detecting terminal and an output terminal. The detecting terminal is electrically connected to the voltage input terminal of the working voltage conversion circuit. The output terminal is electrically connected to the control terminal of the electronic switch.

When the input voltage received by the working voltage conversion circuit approximates a steady-state output voltage of the working voltage conversion circuit, unstable voltage ripples would occur in the output voltage of the working voltage conversion circuit. Based on the circuit configuration of the auxiliary power supply circuit of the present invention, in the voltage follower unit, with the increase of the input voltage and before the Zener diode breaks down, the voltage on the second terminal of the electronic switch is equal to the input voltage and may directly be provided as an auxiliary voltage to the electronic components of the wide input voltage range DC power converter. With the increase of the input voltage and after the Zener diode breaks down, the voltage on the second terminal of the electronic switch is provided as a regulated and stable auxiliary voltage for such electronic components.

As mentioned above, with the increase of the input voltage, and before and after the input voltage is enough to let the Zener diode break down, the electronic components may normally operate according to a stable working voltage. The problem that the electronic components fail to normally operate because the electronic components cannot receive the stable working voltage in the prior art is overcome.

With the increase of the input voltage, after the working voltage conversion circuit reaches the steady state, the output voltage of the working voltage conversion circuit has been stable. The voltage comparison unit of the present invention may turn off the electronic switch of the voltage follower unit.

DETAILED DESCRIPTION OF PREFERRED EMBODIMENT(S)

Figure 1:
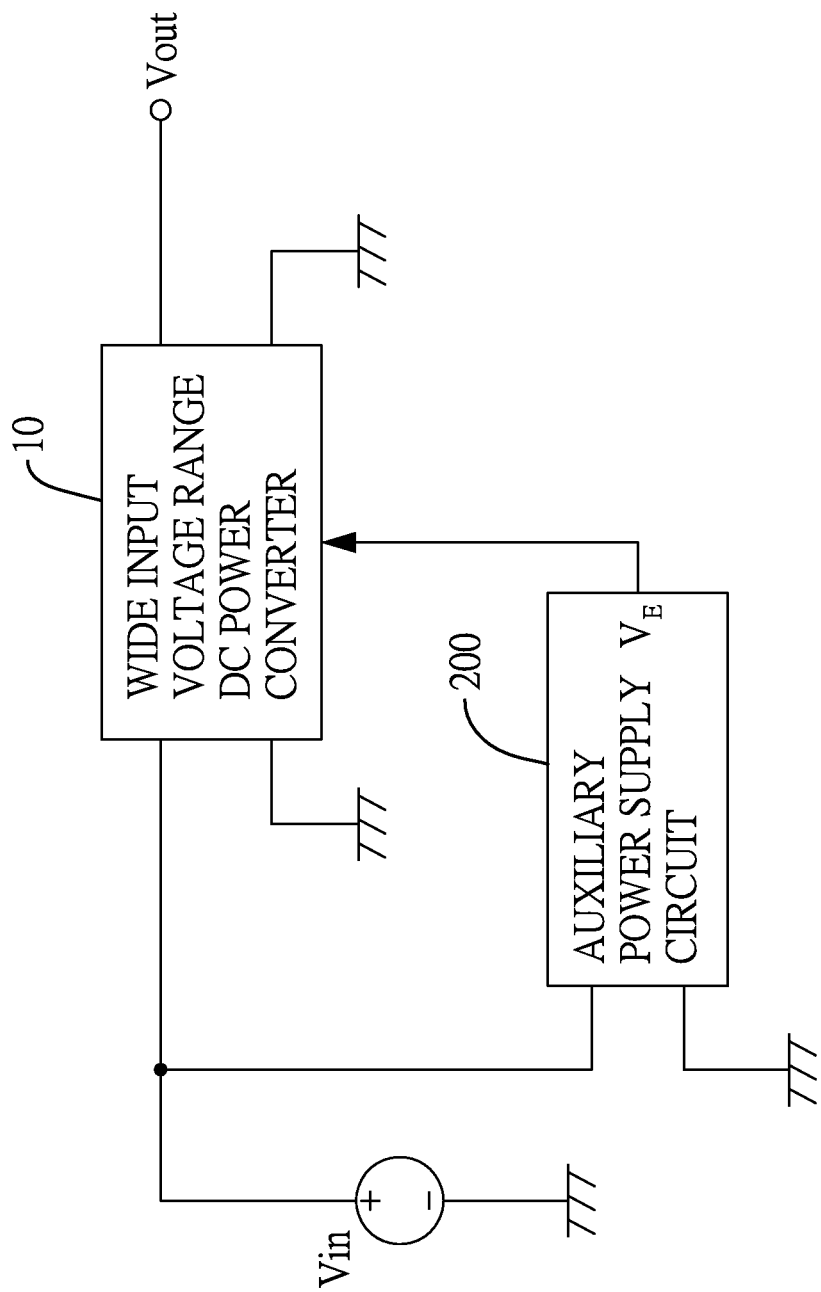
FIG. 1 is a block diagram of an embodiment of the auxiliary power supply circuit of the present invention electrically connected to a wide input voltage range DC power converter.

With reference to FIG. 1, the auxiliary power supply circuit 200 operating within a wide input voltage range of the present invention is applied to a wide input voltage range direct-current (DC) power converter 10. The feature of the wide input voltage range DC power converter 10 is to receive a voltage within an input voltage range from a lower-limit voltage to a higher-limit voltage and convert it to an output voltage Vout. The output voltage Vout may be retained as a constant voltage to be provided to a rear-stage circuit (load). In general, the circuit configuration of the wide input voltage range DC power converter 10 may comprise multiple electronic components, such as a transformer, a working voltage conversion circuit, an integrated circuit (IC), a feedback circuit, transistors, etc. The electronic components' working voltage is received from the working voltage conversion circuit. For example, the IC may be a pulse width modulation controller (PWM controller).

Figure 2:
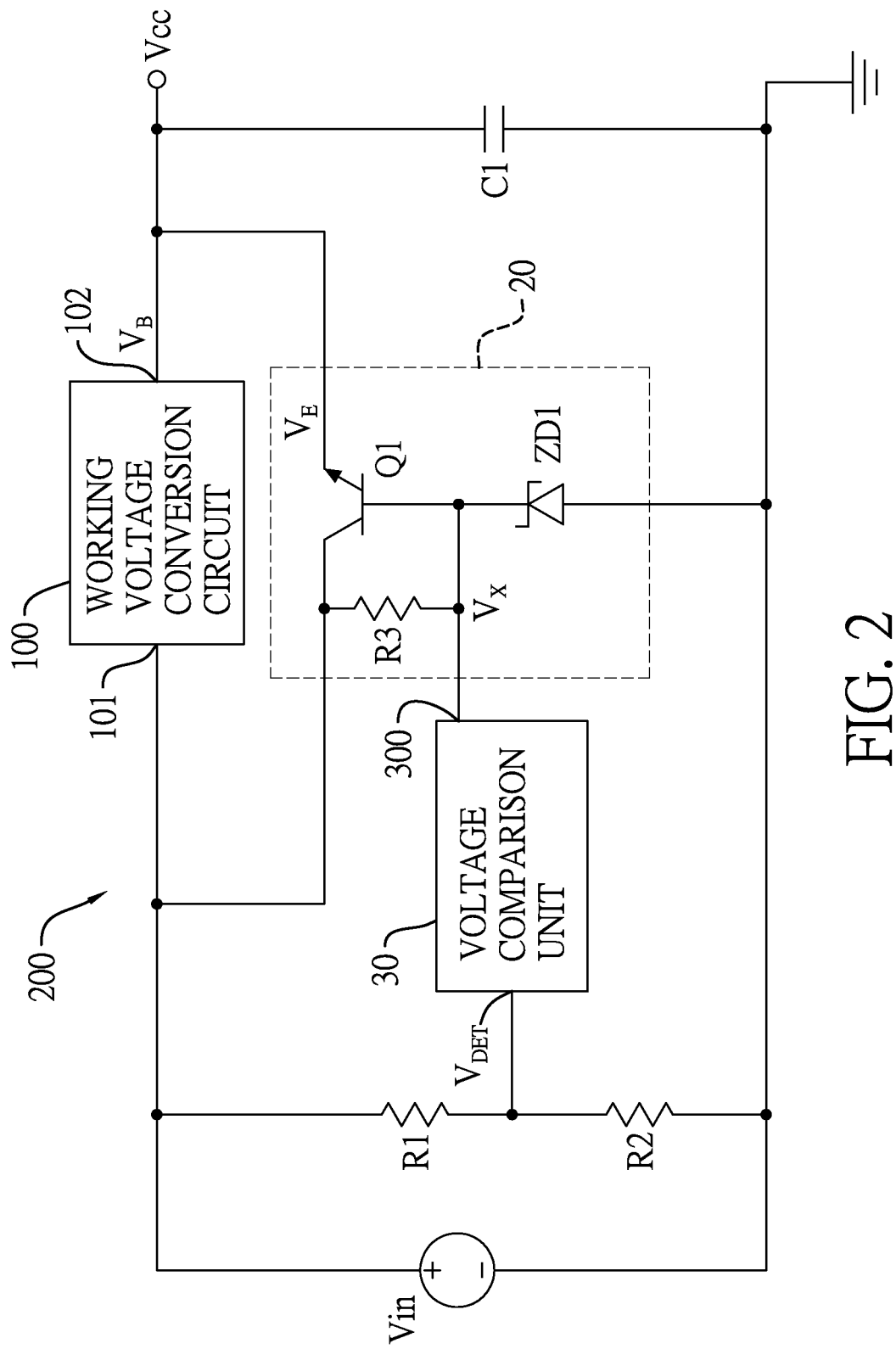
FIG. 2 is a block diagram of an embodiment of the auxiliary power supply circuit of the present invention.

With reference to FIG. 2, the working voltage conversion circuit 100 has a voltage input terminal 101 and a voltage output terminal 102. The voltage input terminal 101 is provided to receive an input voltage Vin. The input voltage Vin is a DC voltage within a wide voltage range. The voltage output terminal 102 outputs an output voltage $V_B$. When the input voltage Vin is higher than a threshold voltage, the working voltage conversion circuit 100 may reach a steady state, such that the output voltage $V_B$ would be retained as a constant voltage and deemed as a steady-state output voltage. The steady-state output voltage may be provided to be the working voltage Vcc of the electronic components. The threshold voltage may be equal to the steady-state output voltage. For example, the input voltage Vin may be within a DC voltage range from 0V to 160V. The steady-state output voltage and the threshold voltage may be a constant voltage of 12V. The DC voltage range, the steady-state output voltage, and the threshold voltage are not limited to the voltage values as mentioned above. The working voltage conversion circuit 100 may be a conventional circuit, such as a Buck circuit, a Forward circuit, a Flyback circuit, a Push-Pull circuit, etc. In the present invention, the working voltage conversion circuit 100 is the buck circuit as an example.

As shown in FIG. 2, an embodiment of the auxiliary power supply circuit 200 of the present invention comprises a voltage follower unit 20 and a voltage comparison unit 30.

The voltage follower unit 20 comprises an electronic switch Q1, a resistor R3, and a Zener diode ZD1. The electronic switch Q1 is a three-terminal component having a first terminal, a second terminal, and a control terminal. The first terminal of the electronic switch Q1 is electrically connected to the voltage input terminal 101 of the working voltage conversion circuit 100. The second terminal of the electronic switch Q1 is electrically connected to the voltage output terminal 102 of the working voltage conversion circuit 100 and adapted to output an auxiliary voltage $V_E$. The auxiliary voltage $V_E$ may be slightly lower than the steady-state output voltage. For example, the auxiliary voltage $V_E$ may be 1V lower than the steady-state output voltage. The resistor R3 is electrically connected between the first terminal of the electronic switch Q1 and the control terminal of the electronic switch Q1. The Zener diode ZD1 has an anode and a cathode. The cathode of the Zener diode ZD1 may be electrically connected to the control terminal of the electronic switch Q1. The anode of the Zener diode ZD1 may be grounded. A breakdown voltage $V_Z$ of the Zener diode ZD1 is lower than the steady-state output voltage. The electronic switch Q1 may be a transistor, such as a bipolar junction transistor (BJT). In the embodiment shown in FIG. 2, the first terminal of the electronic switch Q1 is Collector, the second terminal of the electronic switch Q1 is Emitter, and the control terminal of the electronic switch Q1 is Base. Hence, the circuit configuration of the electronic switch Q1 and the resistor R3 forms an Emitter follower. When the electronic switch Q1 is turned on, the auxiliary voltage $V_E$ is equal to $V_B$-0.7V, wherein $V_B$ is the voltage on the Base of the electronic switch Q1. When the electronic switch Q1 is turned off, the auxiliary voltage $V_E$ is cut off and not outputted.

The voltage comparison unit 30 comprises a detecting terminal $V_{DET}$ and an output terminal 300. The detecting terminal $V_{DET}$ is electrically connected to the voltage input terminal 101 of the working voltage conversion circuit 100 to detect the magnitude of the input voltage Vin. With reference to the embodiment shown in FIG. 2, the detecting terminal $V_{DET}$ of the voltage comparison unit 30 detects the magnitude of the input voltage Vin via a voltage divider circuit consisting of two resistors R1, R2. The output terminal 300 of the voltage comparison unit 30 is electrically connected to the control terminal of the electronic switch Q1, in order to turn on or off the electronic switch Q1 according to the magnitude of the input voltage Vin.

Figure 3:
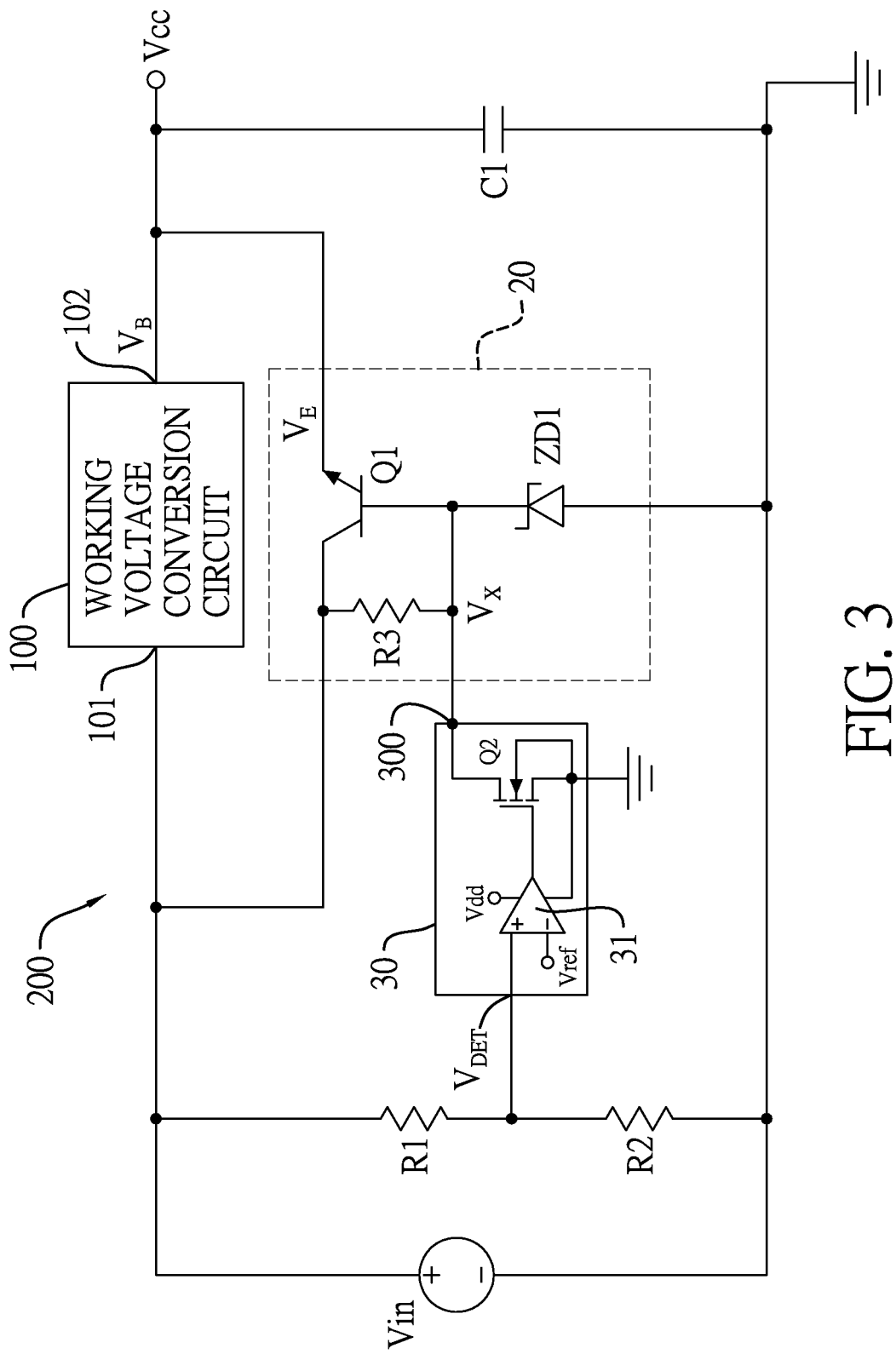
FIG. 3 is a block diagram of an embodiment of the auxiliary power supply circuit of the present invention.

In the embodiment of the present invention, with reference to FIG. 3, the electronic switch Q1 of the voltage follower unit 20 is defined as a first electronic switch. An embodiment of the voltage comparison unit 30 may comprises a comparator 31 and a second electronic switch Q2.

The comparator 31 has a non-inverting input terminal, an inverting terminal, and an output terminal. The non-inverting input terminal is deemed as the detecting terminal $V_{DET}$ of the voltage comparison unit 30. The inverting input terminal receives a reference voltage Vref correlating with a protection voltage. The protection voltage is higher than the threshold voltage. The reference voltage Vref may be equal to a voltage on the resistor R2 divided from the protection voltage. For example, the threshold voltage may be 12V, and the protection voltage may be 15V. The second electronic switch Q2 is a three-terminal component having a first terminal, a second terminal, and a control terminal. The first terminal of the second electronic switch Q2 is deemed as the output terminal 300 of the voltage comparison unit 30. The second terminal of the second electronic switch Q2 is provided to be grounded. The control terminal of the second electronic switch Q2 is electrically connected to the output terminal of the comparator 31. The second electronic switch Q2 may be a transistor, such as a bipolar junction transistor (BJT) or a field effect transistor (FET). In the embodiment shown in FIG. 3, the second electronic switch Q2 is an N-channel metal-oxide-semiconductor FET (N-channel MOSFET). The first terminal of the second electronic switch Q2 is Drain, the second terminal of the second electronic switch Q2 is Source, and the control terminal of the second electronic switch Q2 is Gate.

Figure 4:
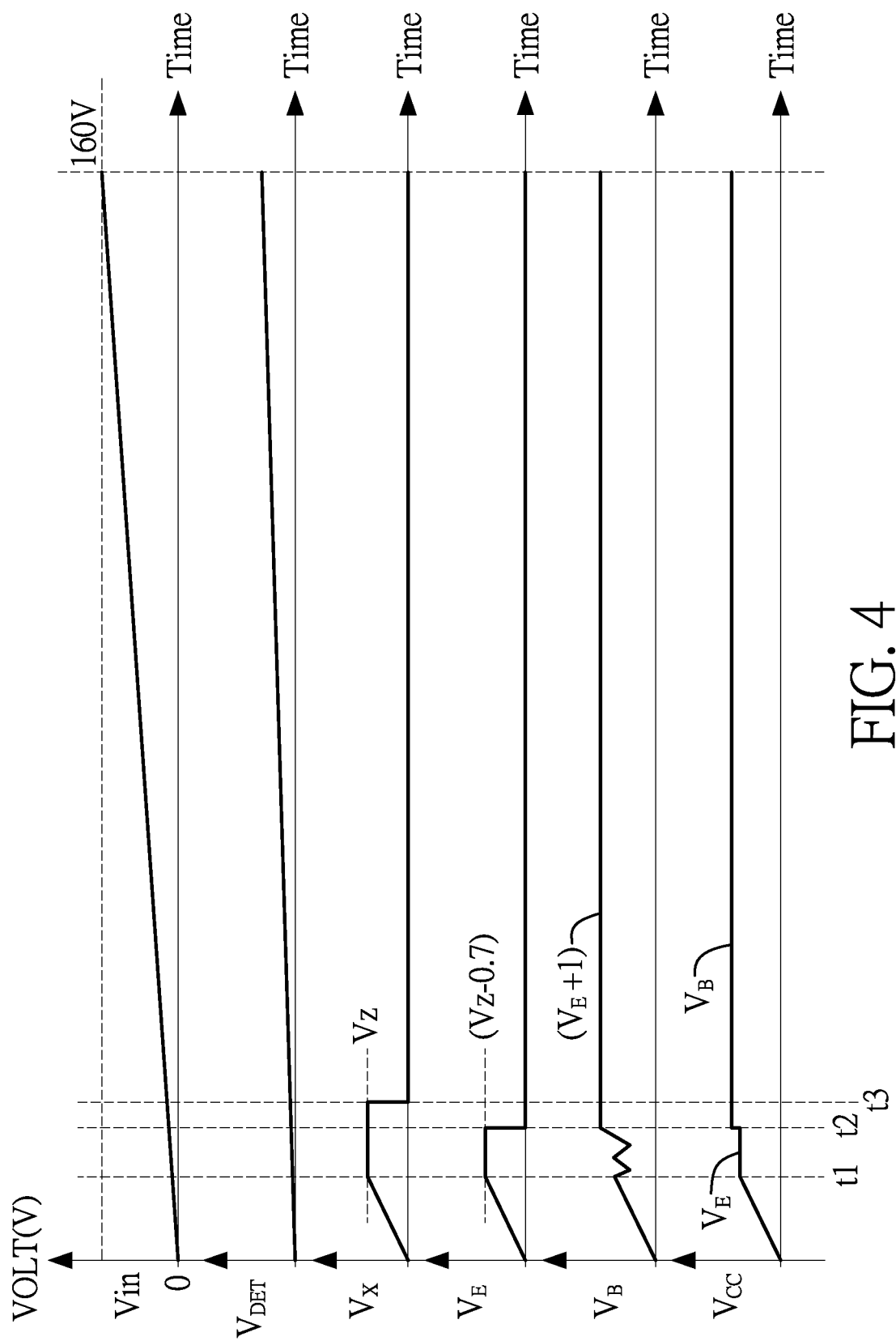
FIG. 4 is a voltage sequence diagram of an embodiment of the auxiliary power supply circuit of the present invention.

With reference to the waveform diagram shown in FIG. 4, the technical effect achieved by the circuit configuration of the present invention is recited as follows. The input voltage Vin higher or lower than the threshold voltage may be deemed as a condition for determining whether a working state of the working voltage conversion circuit 100 is the steady state. Regarding the input voltage Vin started from 0V and before the time point of t1, based on the feature of the Emitter follower, the voltage on the second terminal of the electronic switch Q1 is almost equal to the input voltage Vin, and may be directly deemed as the auxiliary voltage $V_E$ to be outputted to the electronic components of the wide input voltage range DC power converter 10. At this time, the magnitude of the input voltage Vin is still low and not enough to let the Zener diode ZD1 break down, and the voltage on the detecting terminal $V_{DET}$ is lower than the reference voltage Vref, too. Hence, the comparator 31 outputs a low voltage level to turn off the second electronic switch Q2. FIG. 4 depicts the voltage $V_X$ on the control terminal of the electronic switch Q1.

Between time points of t1 and t2, the input voltage Vin approximates the output voltage $V_B$, such that the working voltage conversion circuit 100 does not reach the steady state. Hence, between t1 and t2, unstable voltage ripples occur in the waveform of the output voltage $V_B$ and result in an effect of voltage drop. At this time, the input voltage Vin is high enough to let the Zener diode ZD1 break down. The voltage $V_X$ on the control terminal of the electronic switch Q1 maintains the breakdown voltage $V_Z$ of the Zener diode ZD1. The breakdown voltage $V_Z$ may turn on the electronic switch Q1. As a result, $V_E=V_Z-0.7V$. Since the electronic switch Q1 is turned on, the electronic switch Q1 may output the auxiliary voltage $V_E$ provided as the working voltage Vcc. The auxiliary voltage $V_E$ compensates for the voltage drop induced from the unstable voltage ripples, in order to retain the stabilization of the working voltage Vcc. Between time points of t1 and t2, the input voltage Vin is lower than the threshold voltage, and the voltage on the detecting terminal $V_{DET}$ is lower than the reference voltage Vref, such that the second electronic switch Q2 is still turned off.

Between time points of t2 and t3, the input voltage Vin reaches the threshold voltage, which means the working voltage conversion circuit 100 reaches the steady state and therefore outputs the stable output voltage $V_B$ (the steady-state output voltage) deemed as the working voltage Vcc. At this time, the input voltage Vin does not reach the protection voltage. The voltage on the detecting terminal $V_{DET}$ is lower than the reference voltage Vref. The second electronic switch Q2 is still turned off. On the other hand, as mentioned above, the breakdown voltage $V_Z$ of the Zener diode ZD1 is lower than the output voltage $V_B$ (the steady-state output voltage) which is regulated and maintains a constant. Therefore, a reverse-bias status occurs on the Emitter and the Base of the electronic switch Q1, such that the auxiliary voltage $V_E$ is passively cut off. The output voltage $V_B$ (the steady-state output voltage) is provided to the working voltage Vcc mainly.

After the time point of t3, the output voltage $V_B$ (the steady-state output voltage) has been provided to the working voltage Vcc. When the input voltage Vin reaches the protection voltage, the voltage on the detecting terminal $V_{DET}$ is higher than the reference voltage Vref. As a result, the comparator 31 outputs a high voltage level to turn on the second electronic switch Q2. When the second electronic switch Q2 is turned on, the voltage on the Base of the electronic switch Q1 of the voltage follower unit 20 is low, such that the electronic switch Q1 is turned off. It is to be noted that the auxiliary voltage $V_E$ is passively cut off between the time points of t2 and t3. The electronic switch Q1 is not turned off on t2 directly. In this way, during a switch-on moment under high voltage, the electronic switch Q1 is prevented from being destroyed by sustaining a high power in a sudden when an increase speed of the auxiliary voltage $V_E$ is faster than that of the output voltage $V_B$.

In conclusion, when the input voltage Vin approximates the threshold voltage, although the output voltage $V_B$ is unstable due to the voltage ripples, the working voltage Vcc is provided by the auxiliary voltage $V_E$ on the second terminal of the electronic switch Q1, wherein the auxiliary voltage $V_E$ is more stable than the unstable output voltage $V_B$. Hence, the electronic components may normally operate under the stable working voltage Vcc. When the input voltage Vin is higher than the threshold voltage, which means the working voltage conversion circuit 100 reaches the steady state. Hence, the voltage output terminal 102 provides the electronic components with the output voltage $V_B$ (the steady-state output voltage) as the working voltage Vcc. As a whole, no matter whether the input voltage Vin is low or high, the working voltage Vcc should be stable to ensure normal operations of the electronic components.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An auxiliary power supply circuit operating within a wide input voltage range, applied to be electrically connected to a working voltage conversion circuit of a wide input voltage range direct-current (DC) power converter, and comprising:
   a voltage follower unit comprising:
      an electronic switch comprising:
         a first terminal electrically connected to a voltage input terminal of the working voltage conversion circuit;
         a second terminal electrically connected to a voltage output terminal of the working voltage conversion circuit; and
         a control terminal;
      a resistor electrically connected between the first terminal of the electronic switch and the control terminal of the electronic switch; and
      a Zener diode having a cathode electrically connected to the control terminal of the electronic switch; and
   a voltage comparison unit comprising:
      a detecting terminal electrically connected to the voltage input terminal of the working voltage conversion circuit; and
      an output terminal electrically connected to the control terminal of the electronic switch,
      wherein the electronic switch of the voltage follower unit is defined as a first electronic switch;
   wherein a breakdown voltage of the Zener diode is lower than a threshold voltage;
   wherein the threshold voltage is equal to a steady-state output voltage of the working voltage conversion circuit;
   wherein the breakdown voltage of the Zener diode is lower than the steady-state output voltage,
   wherein the voltage comparison unit comprises:
      a comparator having:
         a non-inverting input terminal deemed as the detecting terminal of the voltage comparison unit;

an inverting input receiving a reference voltage correlating with a protection voltage higher than the threshold voltage; and
an output terminal; and
a second electronic switch comprising:
a first terminal deemed as the output terminal of the voltage comparison unit;
a second terminal provided to be grounded; and
a control terminal electrically connected to the output terminal of the comparator.

2. The auxiliary power supply circuit as claimed in claim 1, wherein:
the first electronic switch is a bipolar junction transistor;
the first terminal of the first electronic switch is Collector;
the second terminal of the first electronic switch is Emitter;
the control terminal of the first electronic switch is Base.

3. The auxiliary power supply circuit as claimed in claim 1, wherein:
the second electronic switch is an N-channel metal-oxide-semiconductor field effect transistor;
the first terminal of the second electronic switch is Drain;
the second terminal of the second electronic switch is Source;
the control terminal of the second electronic switch is Gate.

* * * * *